(12) United States Patent
Kim et al.

(10) Patent No.: US 10,794,751 B2
(45) Date of Patent: Oct. 6, 2020

(54) FUEL LEVEL SENSING APPARATUS FOR FUEL TANK

(71) Applicant: COAVIS, Sejong-si (KR)

(72) Inventors: Young Chang Kim, Cheongju-si (KR); Joon Seop Kim, Daejeon (KR)

(73) Assignee: COAVIS, Sejong-si (KR)

( * ) Notice: Subject to any disclaimer, the term of this patent is extended or adjusted under 35 U.S.C. 154(b) by 278 days.

(21) Appl. No.: 15/711,004

(22) Filed: Sep. 21, 2017

(65) Prior Publication Data
US 2018/0087952 A1   Mar. 29, 2018

(30) Foreign Application Priority Data
Sep. 23, 2016   (KR) .................. 10-2016-0122174

(51) Int. Cl.
  *G01F 23/36*   (2006.01)
  *G01D 5/165*   (2006.01)
  *B60K 15/03*   (2006.01)

(52) U.S. Cl.
  CPC ............ *G01F 23/363* (2013.01); *B60K 15/03* (2013.01); *G01D 5/165* (2013.01); *B60K 2015/03217* (2013.01)

(58) Field of Classification Search
  CPC .......... G01F 23/30; G01F 23/32; G01F 23/36; G01F 23/363; G01D 5/165; B60K 2015/03217; H01C 10/32
  USPC ................................ 73/305, 313, 314, 317
  See application file for complete search history.

(56) References Cited

U.S. PATENT DOCUMENTS 6,588,288 B1 *  7/2003  Swindler .............. G01D 5/1655
                                                    338/126

FOREIGN PATENT DOCUMENTS

CN   101506628 A   8/2009
KR   101416735 B1   7/2014

* cited by examiner

*Primary Examiner* — Benjamin R Schmitt
(74) *Attorney, Agent, or Firm* — The Webb Law Firm

(57) ABSTRACT

Provided is a fuel level sensing apparatus for a fuel tank for sensing a remaining fuel level of the fuel tank through a variation in a measured resistance value depending on a position of a wiper in contact with a resistance substrate. The resistance substrate includes a first segment part and a second segment part disposed to be spaced apart from each other. A resistance setting part of the second segment part is connected to positive electrode terminals, and a connecting part of the first segment part is connected to a negative electrode terminal by a negative electrode lead. A connection point of the negative electrode lead connected to the connecting part is formed between both ends of the connecting part in a length direction. A resistance deviation in a measured resistance value depending on a change in the position of the wiper may be reduced.

4 Claims, 4 Drawing Sheets

FUEL LEVEL SENSING APPARATUS FOR FUEL TANK

CROSS-REFERENCE TO RELATED APPLICATION

This application claims priority to Korean Patent Application No. 10-2016-0122174 filed Sep. 23, 2016, the disclosure of which is hereby incorporated in its entirety by reference.

TECHNICAL FIELD

The following disclosure relates to a fuel level sensing apparatus for a fuel tank for sensing a fuel level of a fuel remaining in a fuel tank provided in a vehicle.

BACKGROUND

Generally, vehicles are provided with fuel tanks that may accommodate various fuels required for driving of engines, and a fuel level sensing apparatus is provided in a fuel tank accommodating a liquid-phase fuel among these fuel tanks in order to allow a remaining level of a fuel to be recognized by a driver.

The fuel level sensing apparatus for the fuel tank is mainly classified into a mechanical fuel level sensing apparatus in which a floater floats on a liquid-phase fuel to allow a resistance value to be changed depending on a height change of the floater and an electronic fuel level sensing apparatus that directly senses a height of a liquid-phase fuel without using a separate floater, and the mechanical fuel level sensing apparatus has been currently used widely due to a low cost.

FIG. 1 is a view illustrating an example of a mechanical fuel level sensing apparatus according to the related art. As illustrated, a resistance substrate 2 is provided in a case 1, and one side of an arm 3 is connected to a floater 7 that may float on a fuel and the other side of the arm 3 is rotatably coupled to the case 1. In addition, a wiper 4 in contact with the resistance substrate 2 while rotating integrally with the arm 3 is provided at the other side of the arm 3. In addition, a resistance pattern as illustrated in FIG. 2 is formed on the resistance substrate 2, a measured resistance value is varied depending on a position of the wiper 4 rotating in a state in which it is in contact with the resistance pattern, and a remaining amount of a fuel is displayed on an instrument panel of a vehicle using the varied resistance value.

Here, the resistance pattern formed on the resistance substrate 2 includes a first segment part 2a and a second segment part 2b separated from each other, the wiper 4 has a pair of contactors electrically connected to each other, one of the contactors may be in contact with the first segment part 2a and the other of the contactors may be in contact with the second segment part 2b to measure the resistance value.

Here, a resistance setting part 2b-1 having a resistance value set to a target is formed in the second segment part 2b, the respective segments of the second segment part 2b separated from one another are connected to one another by the resistance setting part 2b-1, and the respective segments of the first segment part 2a are connected to one another by a connecting part 2a-1.

The connecting part 2a-1 of the first segment part 2a is formed to have a resistance value relatively very smaller than that of the resistance setting part 2b-1 of the second segment part 2b, but has a specific length and resistance, and a deviation is thus generated in a measured resistance value depending on a position of the connecting part 2a-1 that the wiper 4 is in contact with. For example, in the case in which it is assumed that a resistance from the leftmost portion of the connecting part 2a-1 of the first segment part 2a to the rightmost portion thereof is 4Ω, when the wiper 4 is positioned at the leftmost portion, a resistance value in which the resistance of the connecting part 2a-1 is included is measured, such that a resistance value higher than a resistance value set to an actual target by 4Ω may be measured. In addition, when the wiper 4 is positioned at the rightmost portion, a resistance value in which the resistance of the connecting part 2a-1 is not included is measured, such that the resistance value set to the actual target may be measured. That is, a resistance deviation of 4Ω is generated in the measured resistance value depending on a position of the wiper, such that an error may occur in measuring a fuel level.

Therefore, there is a need to develop a fuel level sensing apparatus for a fuel tank capable of reducing the deviation in the measured resistance value depending on the position of the wiper.

RELATED ART DOCUMENT

Patent Document

KR10-1416735 B1 (2014.07.02.)

SUMMARY

An embodiment of the present invention is directed to providing a fuel level sensing apparatus for a fuel tank capable of reducing a resistance deviation in a measured resistance value depending on a change in a position of a wiper in the fuel level sensing apparatus for a fuel tank for sensing a remaining fuel level of the fuel tank through a variation in the measured resistance value depending on the position of the wiper in contact with a resistance substrate.

In one general aspect, there is provided a fuel level sensing apparatus for a fuel tank for sensing a remaining fuel level of the fuel tank through a variation in a measured resistance value depending on a position of a wiper in contact with a resistance substrate, wherein the resistance substrate 1000 includes: a first segment part 100 that includes a plurality of first segments 110 arranged to be spaced apart from each other and connected to one another by a connecting part 120; and a second segment part 200 that includes a plurality of second segments 210 arranged to be spaced apart from each other and connected to one another by a resistance setting part 220 and is disposed to be spaced apart from the first segment part 100, the resistance setting part 220 of the second segment part 200 is connected to positive electrode terminals 300, and the connecting part 120 of the first segment part 100 is connected to a negative electrode terminal 400 by a negative electrode lead 410, and a connection point of the negative electrode lead 410 connected to the connecting part 120 is formed between both ends of the connecting part 120 in a length direction.

The negative electrode lead 410 connected to the connecting part 120 may include a plurality of connection points C1, C2, and C3 formed to be spaced apart from one another.

The negative electrode lead 410 may be extended and formed as one line from the negative electrode terminal 400 up to a reference point S, and a plurality of connection leads 411 may be formed on the basis of the reference point S and be connected to the connecting part 120 of the first segment part 100.

Resistance values between both ends of the connection leads 411 may be the same as one another.

Thicknesses of the connection leads 411 may be the same as one another, but widths thereof may be different from one another.

The connection leads 411 may be formed at the same thicknesses and widths, and one or more of the connection leads 411 may be formed in a shape that is not a linear shape between both ends thereof, such that lengths of the connection leads 411 are the same as each other.

The connecting parts 120 of the first segment part 100 may be formed in plural and be disposed to be spaced apart from each other.

[Detailed Description of Main Elements]

| | |
|---|---|
| 1000: resistance substrate | |
| 100: first segment part | 110: first segment |
| 120: connecting part | |
| 200: second segment part | 210: second segment |
| 220: resistance setting part | |
| 300: positive electrode terminal | |
| 400: negative electrode terminal | |
| 410: negative electrode lead | 411: connection lead |
| A, B: both ends of connecting part in length direction | |
| C1, C2, C3: connection points | S: reference point |

DETAILED DESCRIPTION OF EMBODIMENTS

Hereinafter, a fuel level sensing apparatus for a fuel tank according to the present invention as described above will be described in detail with reference to the accompanying drawings.

Figure 1:
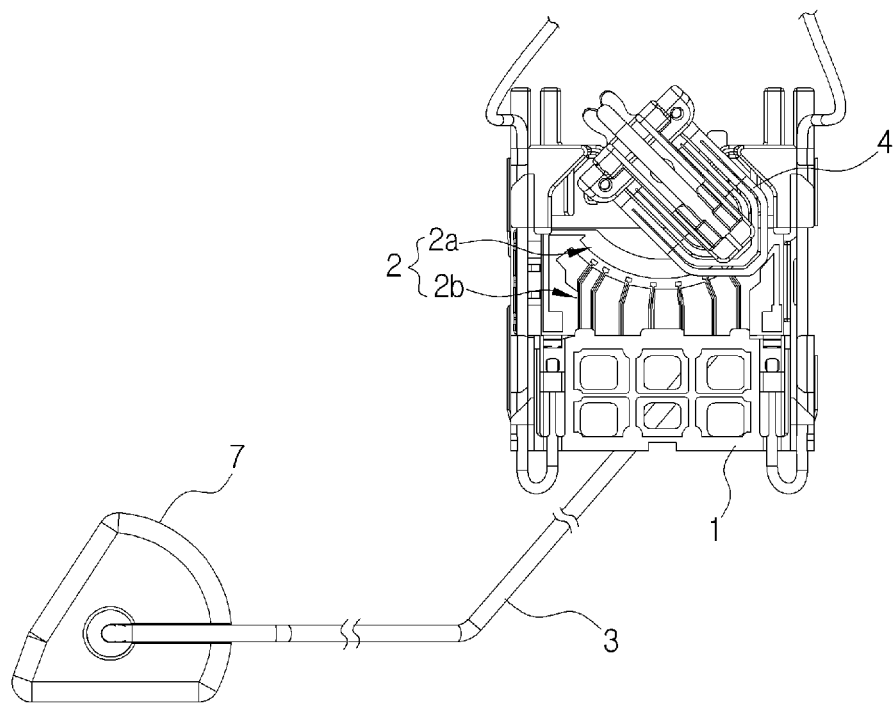
FIG. 1 is view illustrating a fuel level sensing apparatus for a fuel tank according to the related art.
Figure 2:
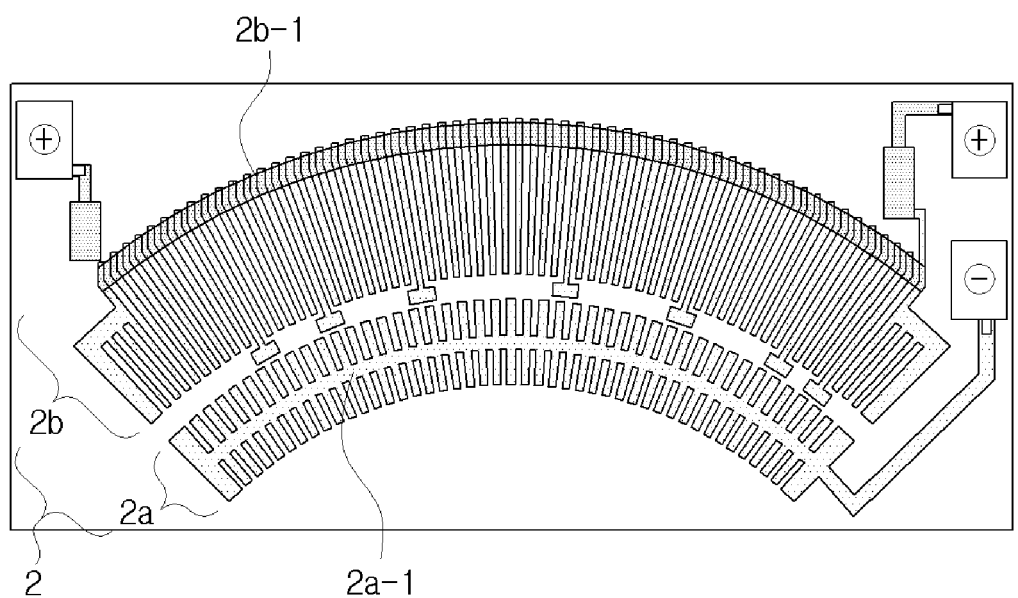
FIG. 2 is a view illustrating a resistance substrate according to the related art.
Figure 3:
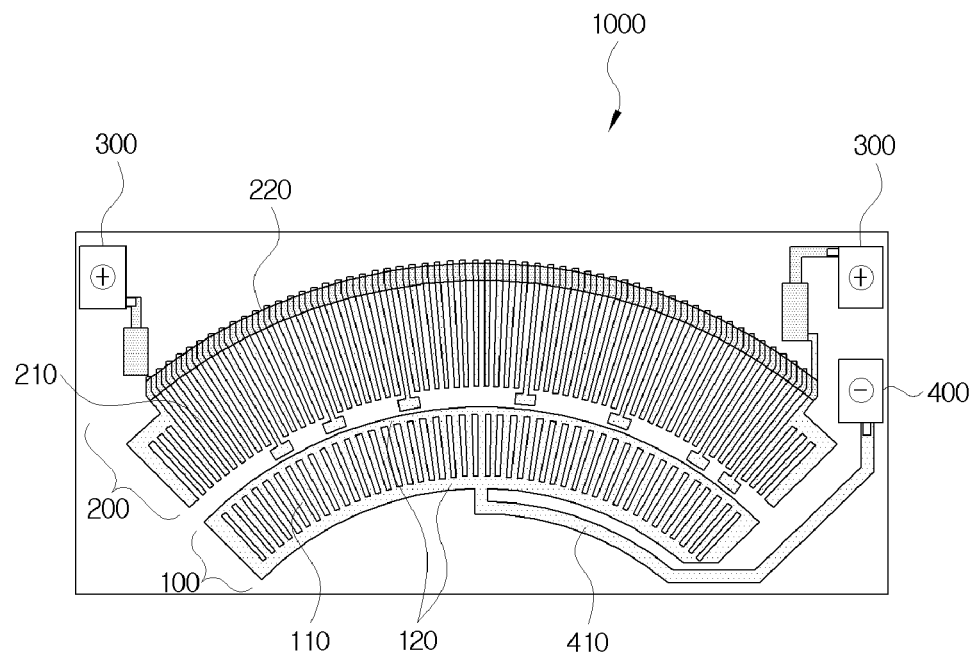
FIG. 3 is a view illustrating a resistance substrate of a fuel level sensing apparatus for a fuel tank according to an exemplary embodiment of the present invention.

FIG. 3 is a view illustrating a resistance substrate of a fuel level sensing apparatus for a fuel tank according to an exemplary embodiment of the present invention.

As illustrated, in the fuel level sensing apparatus for a fuel tank according to the present invention, which is a fuel level sensing apparatus for a fuel tank for sensing a remaining fuel level of the fuel tank through a variation in a measured resistance value depending on a position of a wiper in contact with a resistance substrate, the resistance substrate 1000 may include a first segment part 100 that includes a plurality of first segments 110 arranged to be spaced apart from each other and connected to one another by a connecting part 120; and a second segment part 200 that includes a plurality of second segments 210 arranged to be spaced apart from each other and connected to one another by a resistance setting part 220 and is disposed to be spaced apart from the first segment part 100, the resistance setting part 220 of the second segment part 200 may be connected to positive electrode terminals 300, and the connecting part 120 of the first segment part 100 may be connected to a negative electrode terminal 400 by a negative electrode lead 410, and a connection point of the negative electrode lead 410 connected to the connecting part 120 may be formed between both ends of the connecting part 120 in a length direction.

First, in the fuel level sensing apparatus for a fuel tank according to the present invention, the first segment part 100 and the second segment part 200 may be formed on the resistance substrate 1000 so as to be spaced apart and separated from each other, one contactor formed in the wiper may be in contact with the first segment part 100, the other contactor formed in the wiper may be in contact with the second segment part 200, and the contactors of the wiper may be connected to each other, such that the first segment part 100 and the second segment part 200 may be electrically connected to each other by the wiper. In addition, positions at which the contactors are in contact with the segments are changed by movement or rotation of the wiper, such that a varied resistance value may be measured depending on a position of the wiper.

In addition, as an example, the first segment part 100 and the second segment part 200 may include, respectively, the plurality of first segments and the plurality of second segments arranged to be spaced apart from each other in an arc direction, the connecting part 120 is formed in a direction in which the first segments 110 of the first segment part 100 are arranged, such that the first segments 110 may be electrically connected to one another by the connecting part 120, and the resistance setting part 220 is formed in a direction in which the second segments 210 of the second segment part 200 are arranged, such that the second segments 210 may be connected to one another by the resistance setting part 220.

In addition, as illustrated, the first segment part 100 may be disposed at an inner side in a radial direction to be thus formed in a relatively small arc shape, and the second segment part 200 may be disposed at an outer side in the radial direction to be thus formed in a relatively large arc shape.

Here, all of the first segments 110 of the first segment part 100 and the second segments 210 of the second segment part 200 may be formed of the same one material, and may be formed by printing and then sintering a material having a paste form in a pattern form illustrated in FIG. 3 on a ceramic substrate, or the like. In addition, the resistance setting part 220 of the second segment part 200 may be formed on the second segments 210 using a material different from that of the segments so as to have a specific target resistance value.

Here, one end or both ends, in the length direction, of the resistance setting part 220 of the second segment part 200 having an arc shape may be connected to the positive electrode terminals 300. In addition, the connecting part 120 of the first segment part 100 may be connected to the negative electrode terminal 400 by the negative electrode lead 410, one end of the negative electrode lead 410 may be connected between both ends, in the length direction, of the connecting part 120 formed in an arc shape, and the other end of the negative electrode lead 410 may be connected to the negative electrode terminal 400. That is, the connection point to which one end of the negative electrode lead 410 is connected may be formed at a middle portion of the connecting part 120 in the length direction.

Therefore, when the wiper exists at any position, a resistance between the positive electrode terminal 300 and the negative electrode terminal 400 may be measured. In this case, as a measured resistance value, a resistance value for a path connecting the positive electrode terminal 300, the resistance setting part 220 of the second segment part 200, the second segments 210, the wiper, the first segments 110 of the first segment part 100, the connecting part 120, the negative electrode lead 410, and the negative electrode terminal 400 to one another may be measured. However, since a resistance value of the negative electrode lead 410 is measured as the same value regardless of a position of the wiper, the resistance value of the negative electrode lead 410 connected from the connection point at which the negative electrode lead 410 is connected to the connecting part 120 up to the negative electrode terminal 400 may be reflected in advance in a resistance value set to a target or may be subtracted from the measured resistance value. In addition, in the case in which it is assumed that a resistance from the leftmost portion A of the connecting part 120 in the length direction to the rightmost portion B thereof is 4Ω and the connection point is formed at the center of the connecting part 120 in the length direction, when the resistance between the positive electrode terminal 300 and the negative electrode terminal 400 is measured in a state in which the wiper is positioned at the leftmost portion or the rightmost portion of the connecting part 120 in the length direction, a length of the connecting part 120 corresponding to a path in which the measured resistance value is reflected may be a half of the entire length of the connecting part 120, and the reflected resistance value may also be 2Ω, which is a half of the entire resistance. In addition, when the resistance between the positive electrode terminal 300 and the negative electrode terminal 400 is measured in a state in which the wiper is positioned at the center of the connecting part 120 in the length direction, a length of the connecting part 120 corresponding to a path in which the measured resistance value is reflected may be 0, and the reflected resistance value may also be 0.

As described above, a resistance deviation in the measured resistance value depending on the position of the wiper may be reduced to ½ of the related art by a position of the connection point at which the negative electrode lead 410 is connected to the connecting part 120, and an error in measuring a fuel level may thus be reduced.

In addition, the negative electrode lead 410 connected to the connecting part 120 may include a plurality of connection points C1, C2, and C3 formed to be spaced apart from one another.

Figure 4:
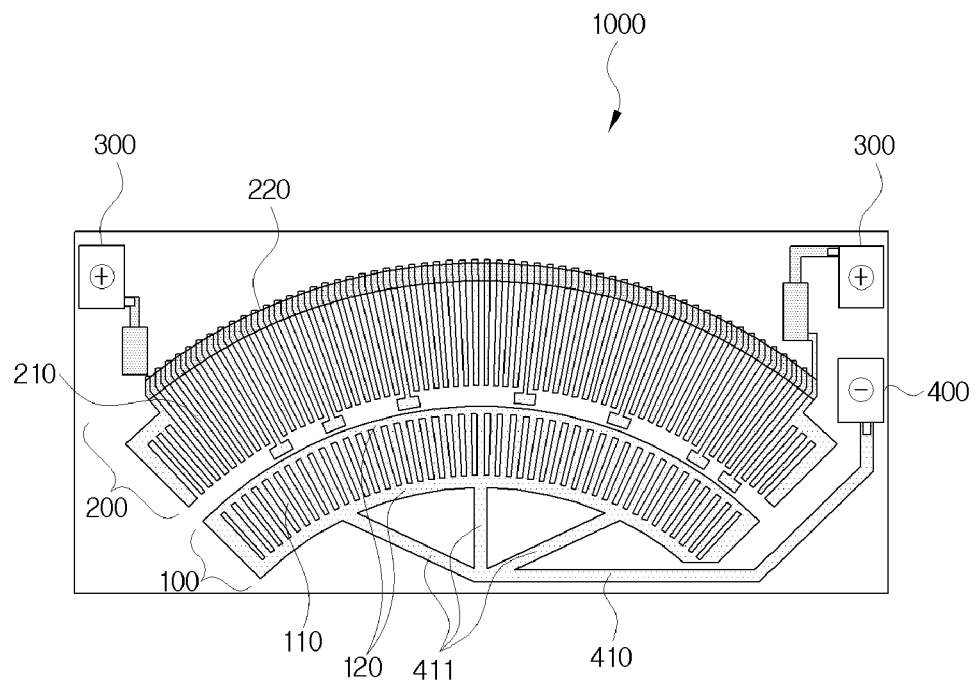
FIGS. 4 and 5 are views illustrating resistance substrates of fuel level sensing apparatuses for a fuel tank according to other exemplary embodiments of the present invention.

That is, as illustrated in FIG. 4, the negative electrode lead 410 is formed to be connected to the connecting part 120 at several points, such that the length of the connecting part 120 corresponding to the path in which the measured resistance value is reflected may be further reduced, and the resistance deviation may thus be further reduced.

Here, the negative electrode lead 410 may be extended and formed as one line from the negative electrode terminal 400 up to a reference point S, and a plurality of connection leads 411 may be formed on the basis of the reference point S and be connected to the connecting part 120 of the first segment part 100.

Figure 5:
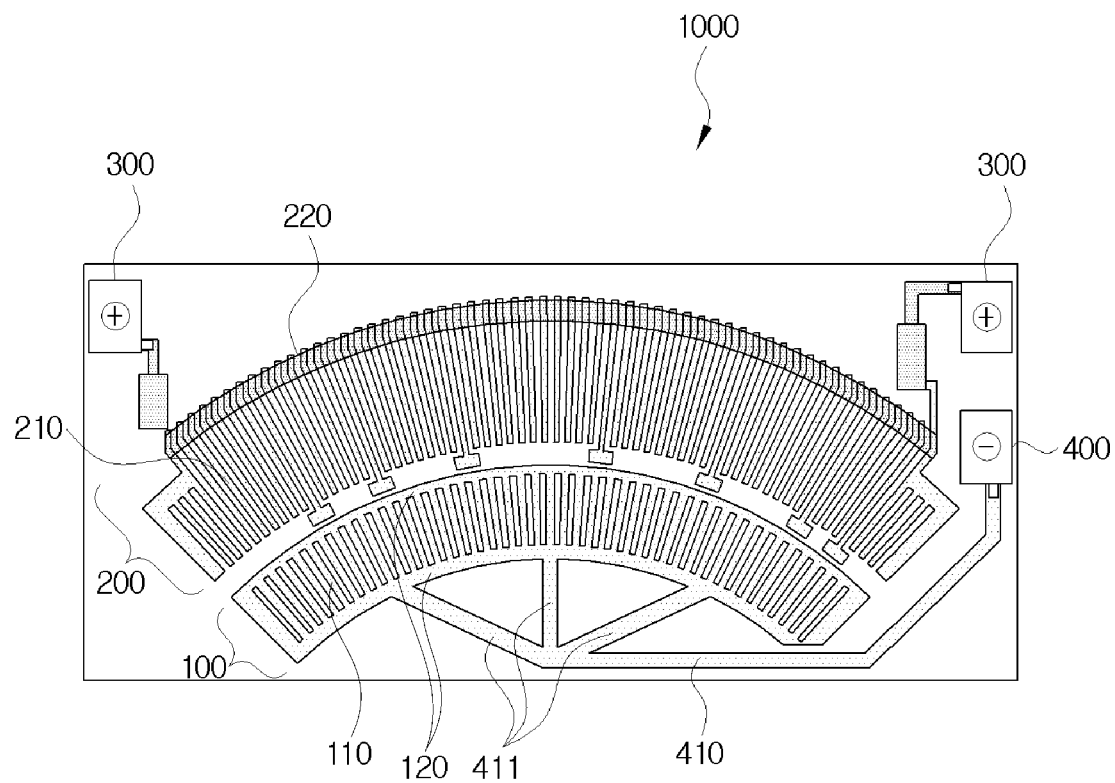
Figure 6:
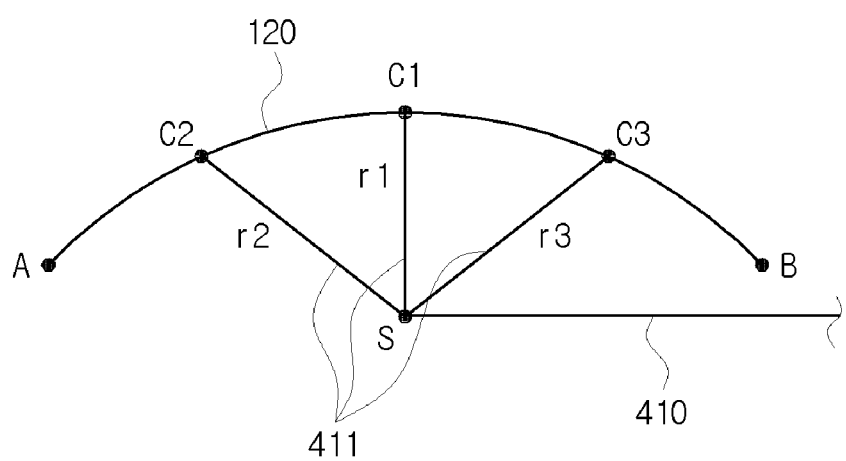
FIGS. 6 to 8 are conceptual diagrams illustrating examples of connection leads of resistance substrates according to the present invention.

That is, as illustrated in FIGS. 4 to 6, the negative electrode lead 410 may be formed as one line from the negative electrode terminal 400 up to the reference point S, and the plurality of connection leads 411 may be branched from the reference point S, be radially formed, and be connected to the connecting part 120 of the first segment part 100, such that the plurality of connection points C1, C2, and C3 spaced apart from one another may be formed. Here, since the ceramic substrate constituting the resistance substrate may be formed in a rectangular shape so as to have a small area as illustrated, the reference point S may be disposed between the center of the arc shape in which the first segment part 100 is formed and the connecting part 120. In addition, the number of reference points S may be one or more.

In addition, resistance values between both ends of the connection leads 411 may be the same as one another. That is, since resistances r1, r2, and r3 of the respective connection leads 411 are the same as one another in order to easily set the target resistance value, the respective connection leads 411 may be formed in various shapes so as to have the same resistance value.

Here, thicknesses of the connection leads 411 may be the same as one another, but widths thereof may be different from one another. That is, in the case in which a connection lead 411 disposed at the center is formed at a relatively short length and connecting leads 411 disposed at the left and the right are formed at a relatively long length, as illustrated in FIG. 5, and the connecting leads 411 are formed of the same material, the connection leads 411 may be formed at the same thickness, but the connecting leads 411 disposed at the left and the right may be formed at a width wider than that of the connection lead 411 disposed at the center, such that resistance values of the connection leads may be the same as one another. Therefore, the resistance deviation in each position of the wiper may be reduced.

In addition, the connection leads 411 may be formed at the same thicknesses and widths, and one or more of the connection leads 411 may be formed in a shape that is not a linear shape between both ends thereof, such that lengths of the connection leads 411 may be the same as each other.

Figure 7:
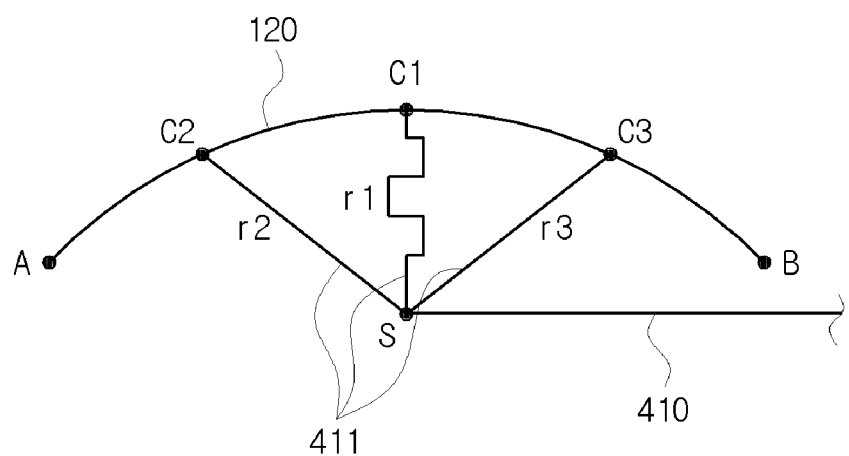
Figure 8:
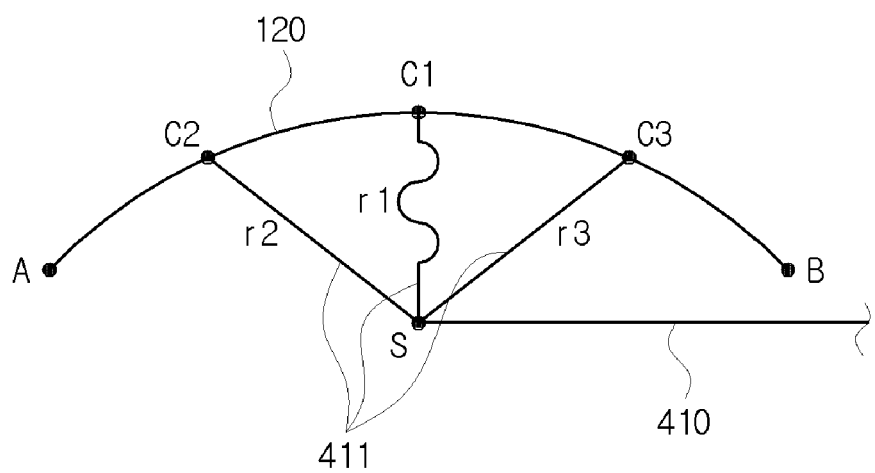

In the case in which the connection lead disposed at the center is formed at a relatively short length and the connecting leads disposed at the left and the right are formed at a relatively long length, as illustrated in FIGS. 7 and 8, and the connecting leads are formed of the same material, the connection leads 411 may be formed at the same thicknesses and widths, but the connecting leads disposed at the left and the right may be formed in linear shapes connecting the respective connection points C2 and C3 and the reference point S to each other, respectively, and the connection lead disposed at the center may be formed in a curved shape such as a waveform, a waveform shape bent in a linear shape, or the like, connecting the connection point C1 and the reference point S to each other so that lengths of all the connection leads are the same as one another. Here, unlike illustrated, the number and shapes of connection leads 411 may be various.

In addition, the connecting parts 120 of the first segment part 100 may be formed in plural and may be disposed to be spaced apart from each other.

That is, as illustrated, two connecting parts 120 may be formed above and below the first segments 110 so as to be spaced apart from each other, and a resistance value may be measured using the two connecting parts 120, such that a resistance may be reduced to a half as compared with a case in which one connecting part is formed and a resistance deviation of the measured resistance value may thus be further reduced.

In the fuel level sensing apparatus for a fuel tank according to the present invention, the resistance deviation in the measured resistance value depending on a change in the position of the wiper may be reduced to reduce a defect of the fuel level sensing apparatus and prevent a quality problem of the fuel level sensing apparatus.

The present invention is not limited to the abovementioned exemplary embodiments, but may be variously applied. In addition, the present invention may be variously modified by those skilled in the art to which the present invention pertains without departing from the gist of the present invention claimed in the claims.

What is claimed is:

1. A fuel level sensing apparatus for a fuel tank for sensing a remaining fuel level of the fuel tank through a variation in a measured resistance value depending on a position of a wiper in contact with a resistance substrate, wherein the resistance substrate includes:
 a first segment part that includes a plurality of first segments arranged to be spaced apart from each other and connected to one another by a connecting part; and
 a second segment part that includes a plurality of second segments arranged to be spaced apart from each other and connected to one another by a resistance setting part and is disposed to be spaced apart from the first segment part,
 the resistance setting part of the second segment part is connected to positive electrode terminals,
 the connecting part of the first segment part is connected to a negative electrode terminal by a negative electrode lead, and a connection point of the negative electrode lead connected to the connecting part is formed between both ends of the connecting part in a length direction,
 the negative electrode lead connected to the connecting part includes a plurality of connection points formed to be spaced apart from one another,
 the negative electrode lead is extended and formed as one line from the negative electrode terminal up to a reference point, and a plurality of connection leads are formed on the basis of the reference point and are connected to the connecting part of the first segment part, and
 thicknesses of the connection leads are the same as one another but widths thereof are different from one another, and resistance values between respective both ends of the connection leads are the same as one another.

2. The fuel level sensing apparatus for a fuel tank of claim 1, wherein the connecting part of the first segment part is formed in a plural number to be spaced apart from each other.

3. A fuel level sensing apparatus for a fuel tank for sensing a remaining fuel level of the fuel tank through a variation in a measured resistance value depending on a position of a wiper in contact with a resistance substrate, wherein the resistance substrate includes:
 a first segment part that includes a plurality of first segments arranged to be spaced apart from each other and connected to one another by a connecting part; and
 a second segment part that includes a plurality of second segments arranged to be spaced apart from each other and connected to one another by a resistance setting part and is disposed to be spaced apart from the first segment part,
 the resistance setting part of the second segment part is connected to positive electrode terminals,
 the connecting part of the first segment part is connected to a negative electrode terminal by a negative electrode lead, and a connection point of the negative electrode lead connected to the connecting part is formed between both ends of the connecting part in a length direction,
 the negative electrode lead connected to the connecting part includes a plurality of connection points formed to be spaced apart from one another,
 the negative electrode lead is extended and formed as one line from the negative electrode terminal up to a reference point, and a plurality of connection leads are formed on the basis of the reference point and are connected to the connecting part of the first segment part, and
 the connection leads are formed to have the same thickness and the same width, and one or more of the connection leads are formed in a shape that is not a linear shape between both ends thereof, such that lengths of the connection leads are the same as each other, and resistance values between respective both ends of the connection leads are the same as one another.

4. The fuel level sensing apparatus for a fuel tank of claim 3, wherein the connecting part of the first segment part is formed in a plural number to be spaced apart from each other.

* * * * *